United States Patent [19]

Gough

[11] Patent Number: 4,890,722

[45] Date of Patent: * Jan. 2, 1990

[54] METHOD AND APPARATUS FOR CONVEYING MATERIALS

[75] Inventor: George T. Gough, Charlotte, N.C.

[73] Assignee: REFAC International, Limited, West Palm Beach, Fla.

[*] Notice: The portion of the term of this patent subsequent to Feb. 2, 2005 has been disclaimed.

[21] Appl. No.: 222,337

[22] Filed: Jul. 19, 1988

Related U.S. Application Data

[63] Continuation-in-part of Ser. No. 906,539, Sep. 12, 1986, abandoned, which is a continuation-in-part of Ser. No. 759,268, Jul. 26, 1985, Pat. No. 4,722,433.

[51] Int. Cl.$^4$ .............................................. B65G 47/40
[52] U.S. Cl. .................................... 198/706; 198/712
[58] Field of Search ............... 198/706, 708, 710, 712

[56] References Cited

U.S. PATENT DOCUMENTS

| | | | |
|---|---|---|---|
| 637,716 | 11/1899 | Dodge | 198/708 X |
| 639,655 | 12/1899 | Berghoefer | 198/706 |
| 725,573 | 4/1903 | Le Grand | 198/706 |
| 776,010 | 11/1904 | Bousse | 198/710 X |
| 1,498,198 | 6/1924 | Philips | 198/706 |
| 1,556,343 | 10/1925 | Philips | 198/710 X |
| 2,729,531 | 1/1956 | Anderson | 198/710 X |
| 2,912,097 | 11/1959 | Vasalli | 198/800 |
| 3,145,829 | 8/1964 | Janouschek et al. | 198/706 |
| 3,199,658 | 8/1965 | Graber et al. | 198/800 X |
| 3,756,002 | 9/1973 | Mecca | 198/706 X |
| 4,493,413 | 1/1985 | Harrell | 198/708 |
| 4,607,745 | 8/1986 | Wiese | 198/706 |
| 4,722,433 | 2/1988 | Gough | 198/710 X |

FOREIGN PATENT DOCUMENTS

| | | | |
|---|---|---|---|
| 221415 | 4/1910 | Fed. Rep. of Germany | 198/710 |
| 2573052 | 5/1986 | France | 198/712 |
| 339866 | 9/1959 | Switzerland | 198/710 |
| 899400 | 1/1982 | U.S.S.R. | 198/706 |
| 592358 | 9/1947 | United Kingdom | 198/708 |

Primary Examiner—Robert J. Spar
Assistant Examiner—Cheryl L. Gastineau
Attorney, Agent, or Firm—W. Thad Adams, III

[57] ABSTRACT

A conveyor system comprising a series of buckets supported by a chain along a predetermined endless path having straight portions and at least one internal curve. An individual pivoting arm supports a respective bucket on the chain. Each pivoting arm is pivotally attached to the entrainment means at a first end in fixed orientation to the chain, and pivotally supports the bucket at the opposite, second end. A chain guide engages the chain in advance of an internal curve in the path to cause the second end of the pivoting arm to which the bucket is attached to pivot outwardly and the buckets in turn to follow a diverging curved path of greater radius than the radius of the curve in the path being transited and thereby space the buckets further apart prior to negotiating the internal curve in the path than when the buckets are proceeding along a straight portion of the path.

8 Claims, 8 Drawing Sheets

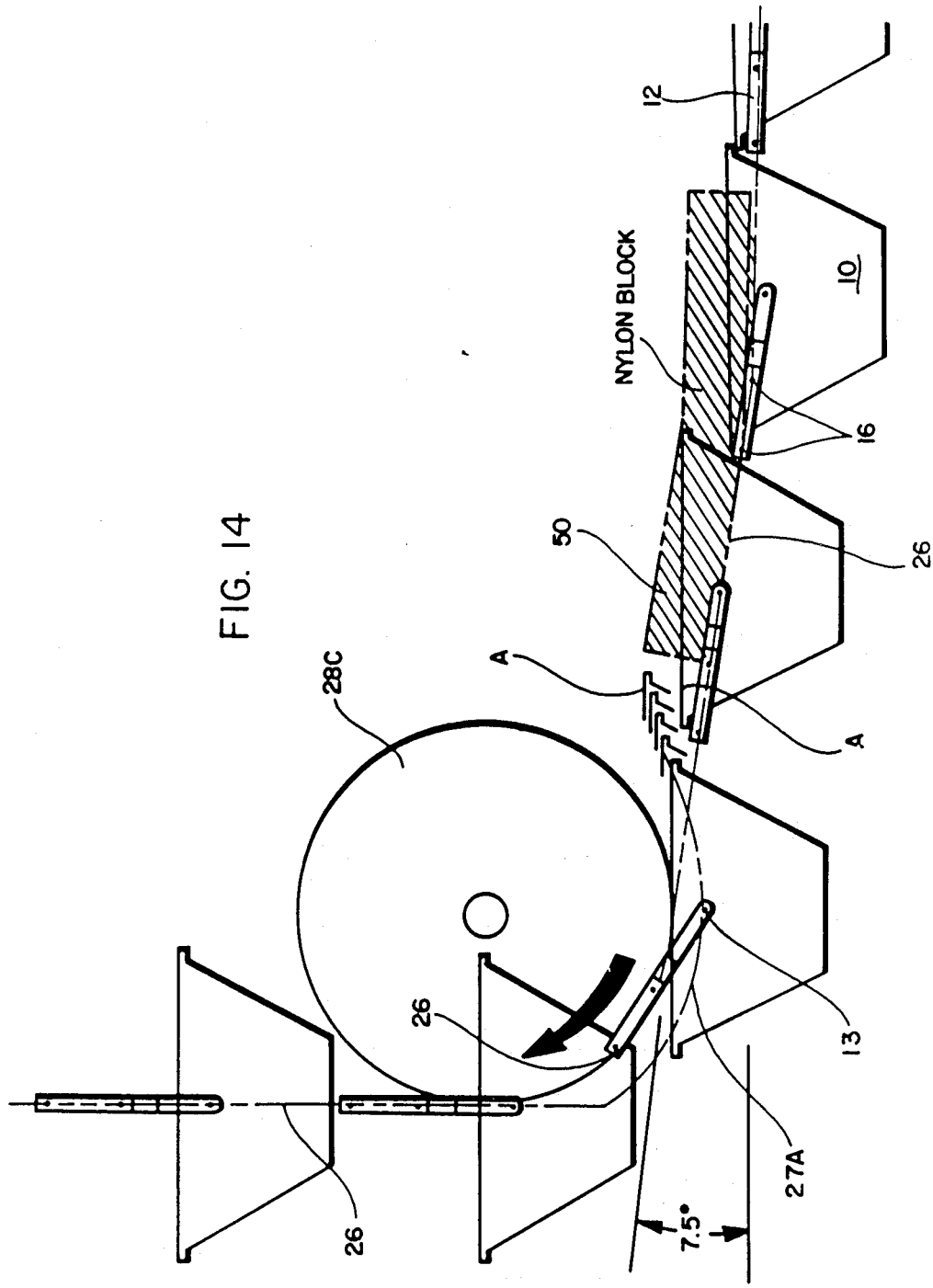

METHOD AND APPARATUS FOR CONVEYING MATERIALS

TECHNICAL FIELD AND BACKGROUND OF THE INVENTION

This application is a continuation-in-part application of U.S. Ser. No. 906,539 filed Sep. 12, 1986 now abandoned which is a continuation-in-part of U.S. Ser. No. 759,268 filed July 26, 1985, now issued as U.S. Pat. No. 4,722,433, issued on Feb. 2, 1988.

This invention relates to a conveyor or elevator system of the type that comprises a series of buckets supported by a driven chain or cables to move the buckets along a predetermined path and a related method. It is desirable in such systems to have the buckets arranged close together and very often the buckets are interlocked or overlapped. It is also desirable to enable the buckets to be maintained in a substantially horizontal attitude at all times.

When the buckets negotiate vertical turns, internally or externally, if the buckets are interlocked or overlapped or even if they are very close together there is a tendency for the buckets to interfere with each other so that some of the buckets tip and dislodge their load. This problem can be solved simply by moving the buckets further apart. However, this creates other problems. The carrying capacity of a conveyor is a function of bucket size, rate of travel, and the number of buckets per unit of distance on the conveyor. Increasing the spacing between the buckets substantially reduces the carrying capacity of the conveyor system. In addition, at certain points on the conveyor, for example at the filling position, a touching or overlapping relation between adjacent buckets is desirable to prevent product from falling between spaces between the buckets. For all of these reasons, it is desirable to space the buckets closely together. However, this has not been possible in prior art devices since close spacing causes interference between buckets on curves, particularly on internal curves. The invention described in this application permits very close and even overlapping spacing between buckets on straight sections of the conveyor while moving the buckets apart on curves.

SUMMARY OF THE INVENTION

Therefore, it is an object of the invention to provide an elevator or conveyor system in which this difficulty is overcome and in which the buckets may be arranged to assume a horizontal attitude at all times.

In accordance with the present invention an elevator or conveyor system comprises a series of buckets supported by a driven chain or cable along a predetermined path, the buckets being supported on the chain or cable by means of individual pivoting arms. Guidance means are provided in the path to cause the arms to swing outwardly away from the chain or cable so that the buckets move outwardly and follow a curve of greater radius than the radius of the curve or bend in the path. The buckets are thereby spaced further apart when going around a curve or bend than when they are proceeding along a straight portion of the path.

Preferably, the buckets are arranged to be very close together or touching or overlapping or even interlocked along the straight portions of the path but to separate when the buckets go around a curve or bend and the buckets are maintained in a substantially horizontal attitude at all times.

Preferably, each arm is provided with a cam follower or roller engaged in a track which normally runs parallel to the path of the chain or cable along the straight sections but is diverted outwardly away from the chain or cable at curved sections.

If a chain is employed it may have rollers or wheels at intervals along its length to engage a track to guide the chain.

Means may be provided to empty the buckets comprising a cam located alongside the path of the chain or cable and a corresponding cam follower on each bucket to cause the bucket to tip and empty when the cam follower engages the cam.

In another embodiment of the invention a bucket elevator comprises a plurality of buckets carried by individual links pivoted on a driven chain arranged to follow a path comprising straight and curved sections. Each arm preferably has a cam follower or roller that at bends in the path cause the arms to pivot and thus move the buckets away from the path of the chain or cable whereby the buckets follow a curve of greater radius than the chain or cable at said bends.

Preferably, each of the pivoting arms is connected to a bucket by means of a bucket pin and the pin carries the roller. The rollers which are employed for bucket support may be carried on a shaft which performs the additional function of acting as the pivot point for the pivoting arm where it is pivoted to the chain. The shaft may pass through a pair of links and form the means of hinging the links of the chain together.

The invention is preferably applied to a bucket elevator of the self-contained type which is provided with a loading station and an unloading station and a driven chain having a vertical or inclined section so as to raise the buckets from the loading station to the unloading station.

BRIEF DESCRIPTION OF THE DRAWINGS

Some of the objects of the invention have been set forth above. Other objects and advantages of the invention will appear as the description of the invention proceeds when taken in conjunction with the following drawings, in which:

FIG. 14 shows the chain path and the bucket center line path that is a feature of bucket control when negotiating an internal turn;

DESCRIPTION OF THE PREFERRED EMBODIMENT

Figure 1:
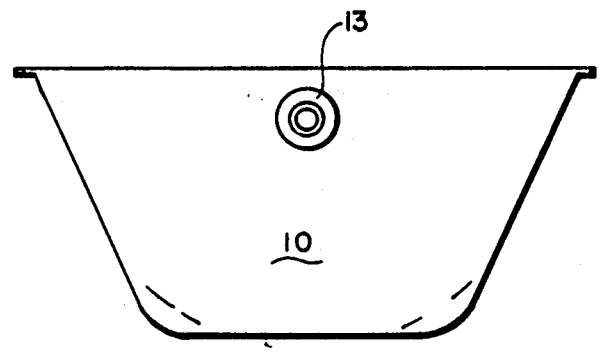
FIG. 1 is an end elevation of an elevator bucket for use with an elevator or conveyor system in accordance with the invention.
Figure 2:
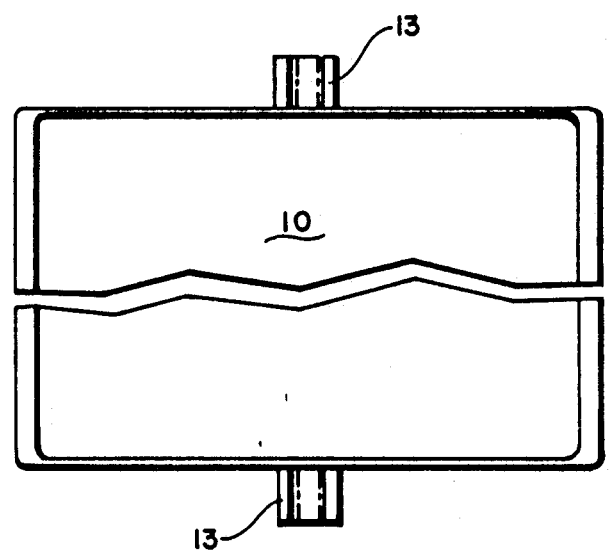
FIG. 2 is a fragmentary plan view of the bucket shown in FIG. 1.
Figure 3:
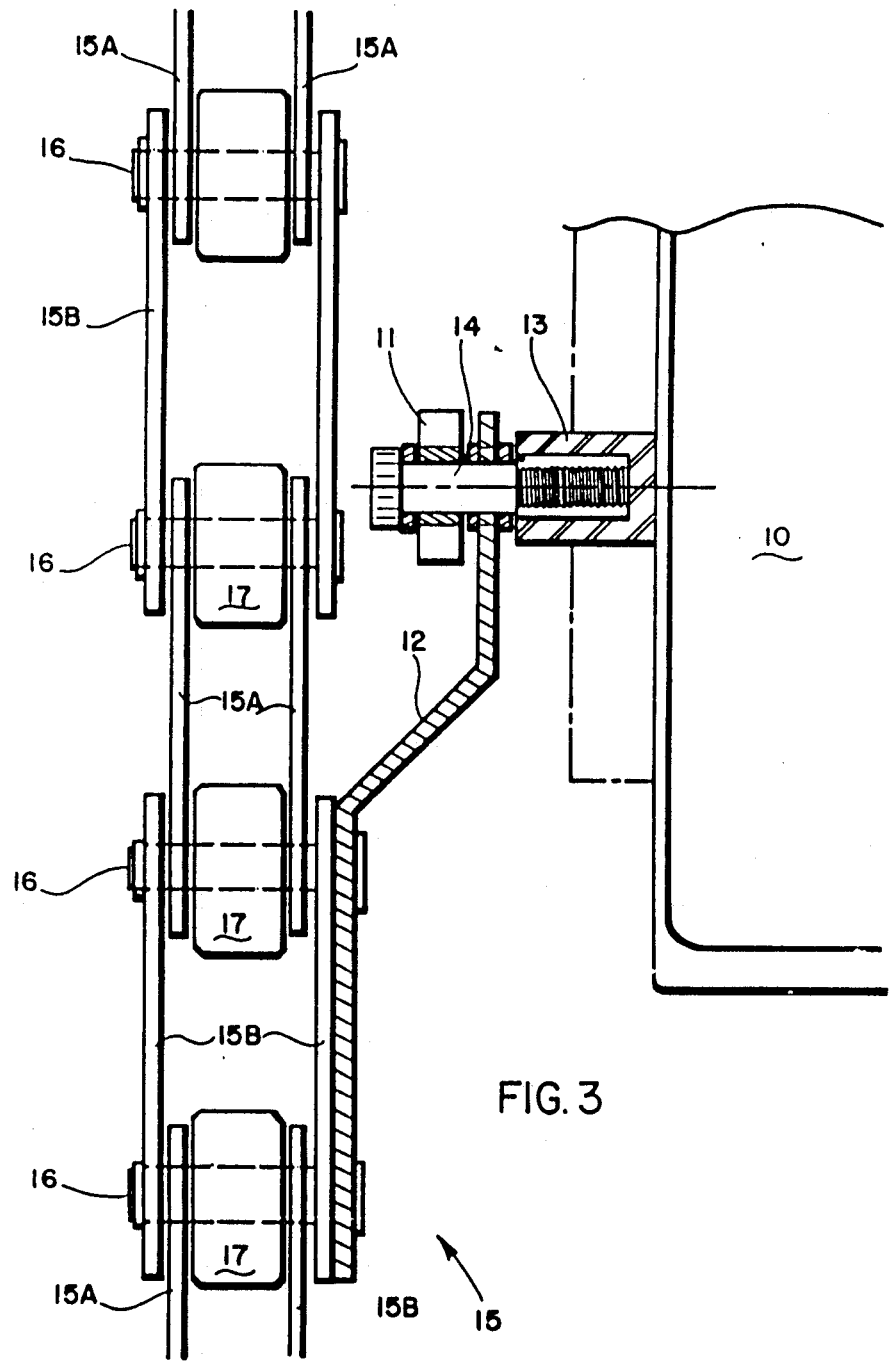
FIG. 3 is a horizontal section through a portion of a chain of a bucket elevator and shows the way in which each bucket is pivoted to the chain by a pivoting arm.
Figure 4:
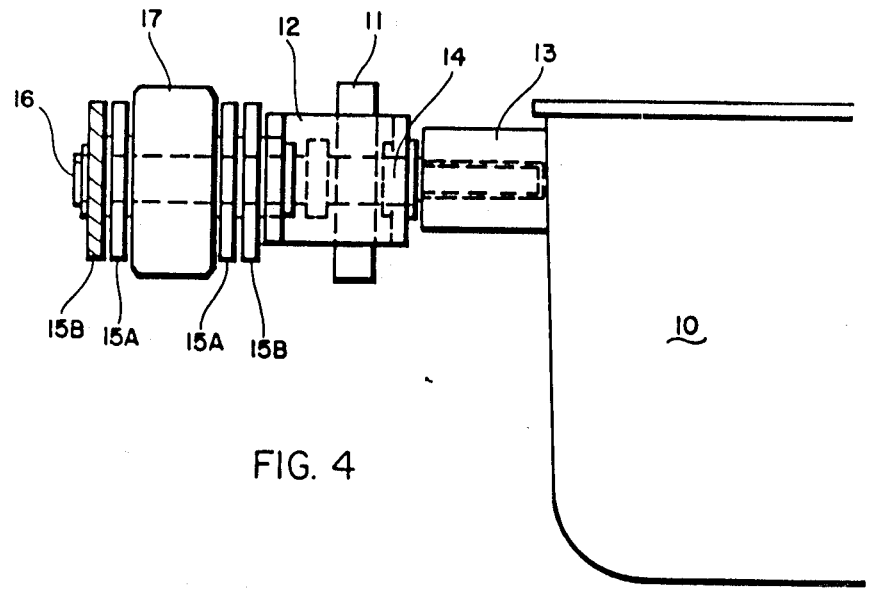
FIG. 4 is a section plan view of a bucket elevator showing the buckets supported from a standard roller type chain.

Referring now specifically to the drawings, in FIGS. 1, 2 and 3 each bucket 10 of the bucket elevator carries a trunnion 13 and is pivoted by a bucket pin 14 to a pivoting arm 12. As is shown in FIG. 3, the bucket pins 14 each preferably carry a roller 11 for contact with support means, such as a cam track as will be described later.

A driven chain 15 is constructed of pairs of chain links 15A, 15B with a shaft 16 passing through the junction of an opposed pair. The pivoting arm 12 is pivoted to one end of a pair of adjacent shafts 16. Each pair of chain links 15A, 15B carries a pair of spaced-apart chain rollers 17 by means of the two shafts 16. In this manner, the pivoting arm 12 is positioned in a fixed orientation with relation to that particular link of the chain 15. This assembly of links 15A, 15B, shaft 16 and pivoting link 12 is repeated consistent with the bucket pitch in the chain 15 so as to support the buckets 10, as illustrated in FIGS. 3, 4, 5 and 6.

Figure 5:
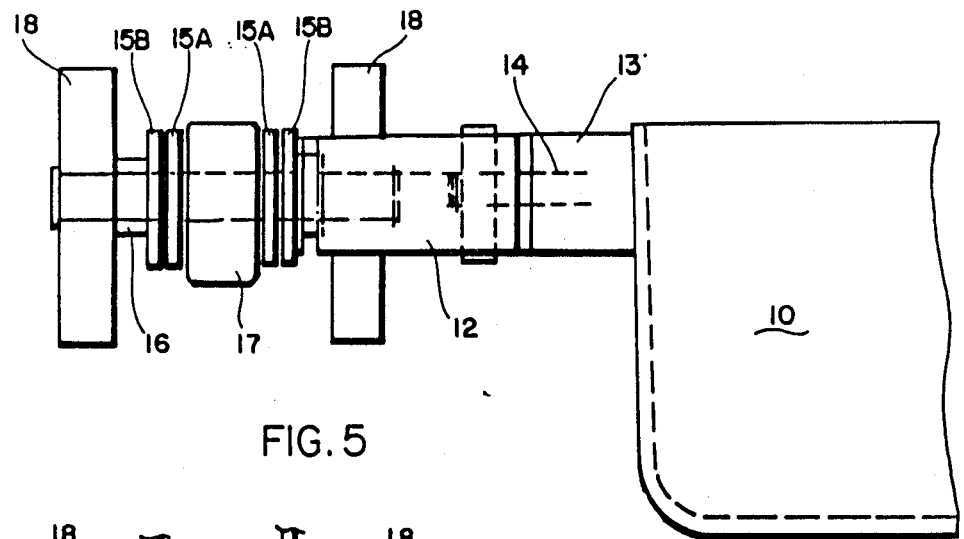
FIG. 5 is an end elevation of a bucket elevator showing the buckets supported from a standard roller type chain that has a modified pivoting arm and additional chain guide wheels to enable single chain suspension.
Figure 6:
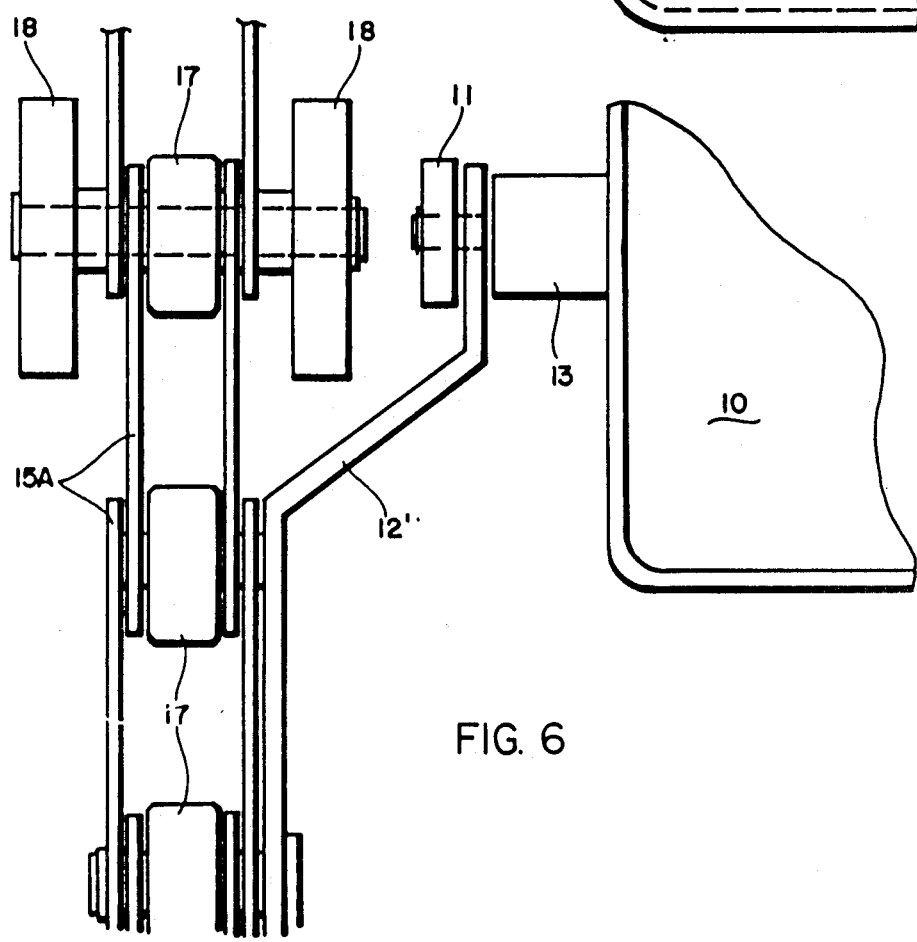
FIG. 6 is a side elevation of a bucket elevator showing the buckets supported from a standard roller type chain that has a modified pivoting arm and additional chain guide wheels to enable single chain suspension.

As is shown in FIGS. 5 and 6, an alternate system is shown wherein bucket 10 is supported by pivoting arm 12' on chain 15' with outriding chain guide rollers 18 which permit use of a single chain 15 on a track of the type wherein the chain rollers support the bucket 10 by riding on the chain 15 at two spaced-apart points in cantilevered fashion.

Figure 7:
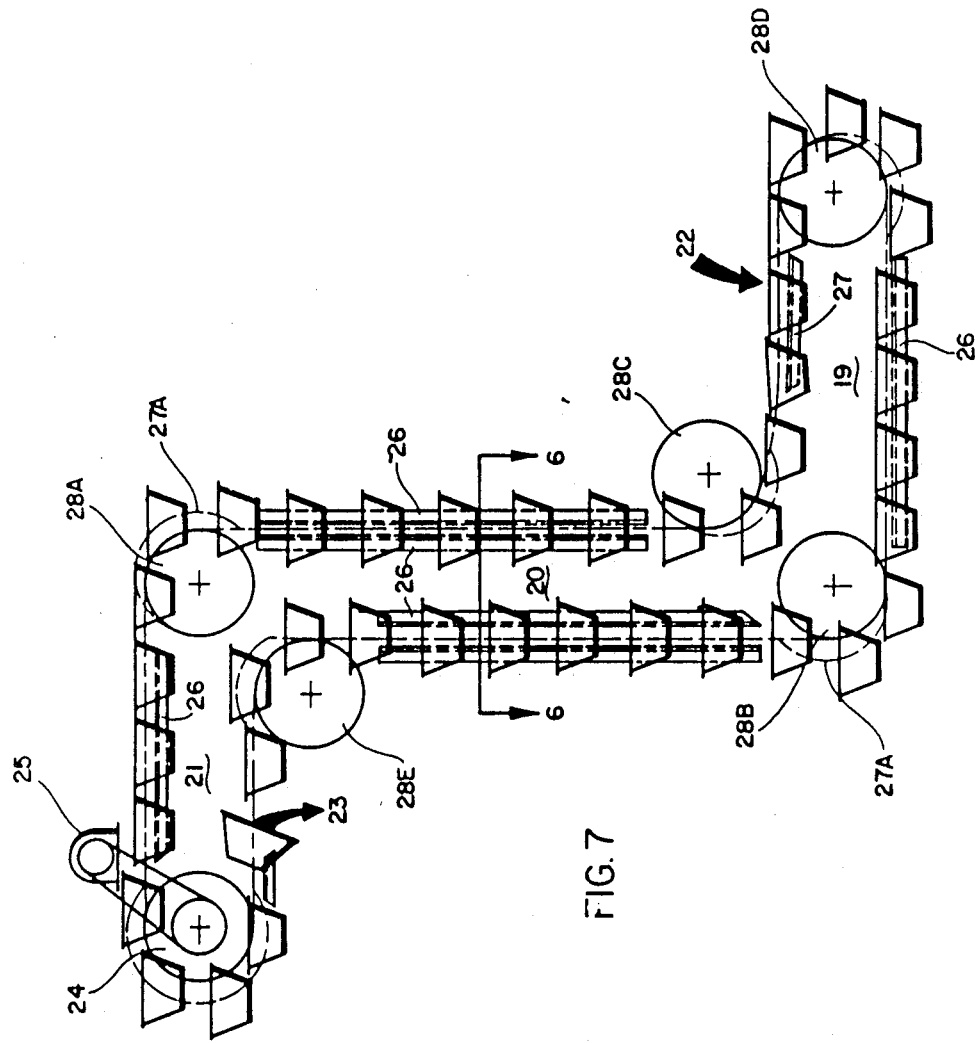
FIG. 7 is a schematic side elevation of a bucket elevator showing the buckets supported from the chain.

Referring now to FIG. 7, the bucket elevator comprises a horizontal section 19, a vertical section 20 and an upper horizontal section 21. The material is loaded into the bucket 10 at a loading station 22 and discharged at a discharge section 23.

The chain 15 is preferably driven by a drive sprocket 24 in turn driven by an electric motor 25. The conveyor is supported at other points along its length where turns are made by driven sprockets 28A, 28B, 28C, 28D and 28E.

The terms "internal curve" and "external curve" are used in the application to define the relationship between the chain and the sprockets of the conveyor. As used in this application, including the claims, the term "internal curve" refers to a curve defined by the chain passing over the surface of a sprocket where the sprocket is positioned outside the circuit of the chain. Sprocket 28C in FIG. 7 identifies such an internal curve.

The term "external curve" refers to a curve defined by the chain passing over the surface of a sprocket where the sprocket is positioned inside the circuit of the chain. Sprocket 28D in FIG. 7 identifies such an external curve.

Figure 15:
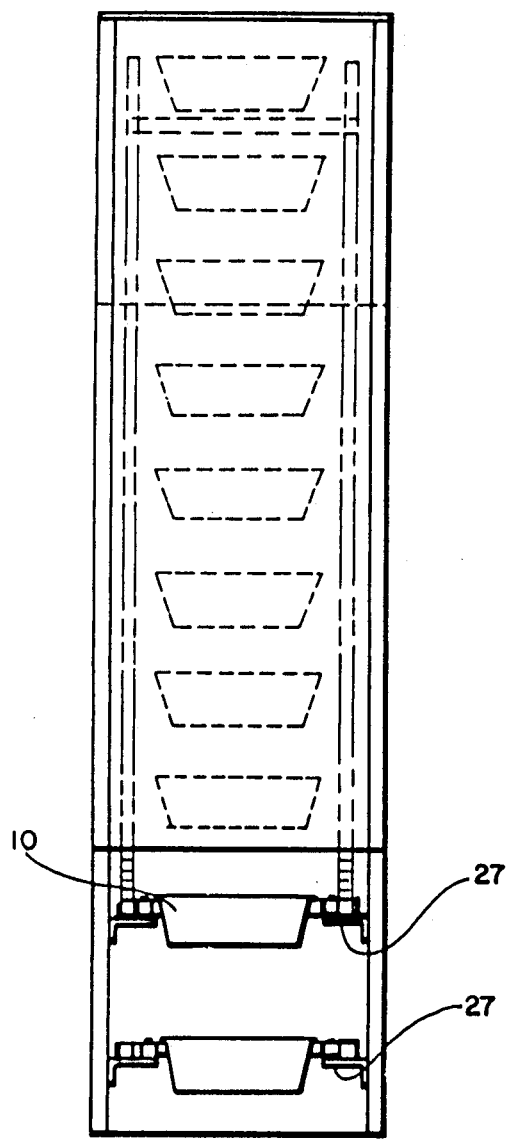
FIG. 15 illustrates a run of the conveyor showing the chain tracks.
Figure 16:
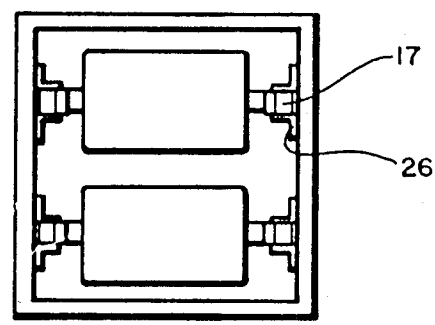
FIG. 16 illustrates a run of the conveyor showing chain rollers at tracks

Chain rollers 17 run in tracks 26 and rollers 11 run on an extended track 27 (see FIGS. 15 and 16). At curved parts of the conveyor path the bucket pivot point diverges away from track 27, (see for example section 27A of track 27 in FIG. 7).

When the buckets 10 are proceeding along a straight portion such as horizontal section 19 or on a vertical portion such as 20, the pivoting arms 12 will remain parallel with the tracks 26 and 27. This is best shown in FIG. 14. However, when the tracks diverge as at section 27A the rollers 11 will follow the diverging path 27A and arms 12 will swing so that the buckets 10 move away from the tracks in an outward direction. As seen at 27A, the path created by the diverging portion of the track 27 is of greater radius than the radius of sprocket 28D. Thus the buckets 10 are caused to follow the curve of greater radius and therefore separate from each other during their passage around the bend. The buckets 10 can thus proceed around the bend while maintaining their horizontal attitude without interfering with each other.

By continued reference to FIG. 14, it can be seen that the center line of chain 15 is shown "chain dotted" and the unnatural path of the bucket trunnion 13 is shown as a dotted line.

It will be seen that unless an approach angle of approximately 7¼ degrees is maintained at a precise point prior to the turn than the unnatural path of the bucket trunnion will cause the buckets to move downward causing the bucket lips to interfere with each other and dislodge their load. The approach angle is defined by a guide such as a nylon block 50 (see shaded area on FIG. 14) on which the chain rides. A gap must be created at point "A" on FIG. 14. This gap will then provide for the correct bucket lip clearance in developing the main tangent angle of the pivoting arm 12 causing the bucket 10 trunnion to take this unnatural path and provide clearance for the buckets 10 to pass each other and negotiate around this terminal point without collisions.

This configuration results from the fixed orientation of the pivoting arms 12 in relation to the portion of the chain by attachment to two separate shafts 16, as is best shown in FIGS. 3 and 6.

Each of the curves may be configured in the same way so that the path 27 diverges from the path 26. The particular shape of the diverging part will depend upon the curvature of the bend and other factors.

Figure 8:
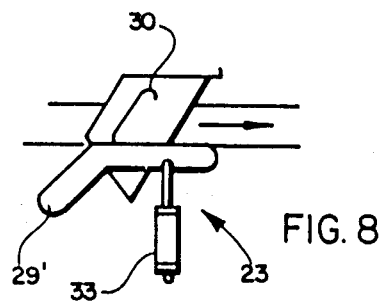
FIG. 8 is an enlarged, fragmentary view of the bucket discharge ramp shown in FIG. 7.

Referring now to FIG. 8, at the discharge station 23 a cam 30 located on each bucket 10 contacts a discharge ramp 29 causing the bucket 10 to tip and discharge. A cam 30 is positioned on the outer side of bucket 10 and so arranged as to cause the bucket 10 to pivot through approximately 100' of arc and dislodge its load. The ramps or tipping positions can be at one or several different positions and can be remotely controlled through an air cylinder 33 or hydraulic rams or solenoids or actuators of various types.

Figure 9:
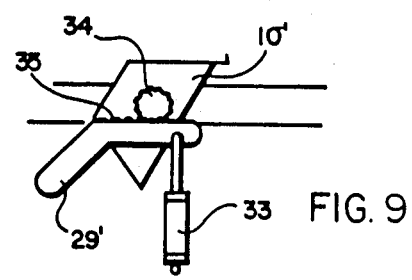
FIG. 9 shows a means of discharging the bucket alternate to that shown in FIGS. 7 and 8.
Figure 10:
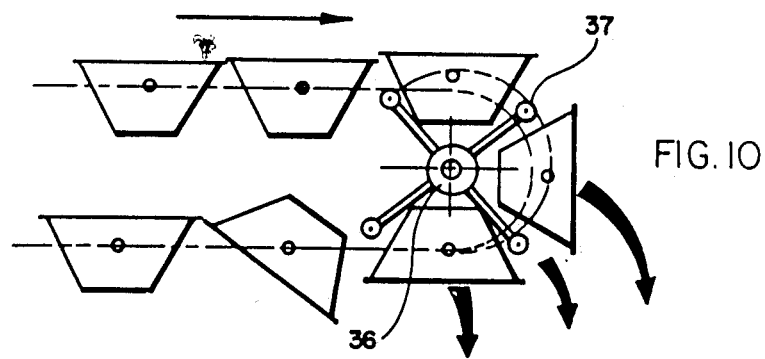
FIG. 10 shows a means of discharging the bucket alternate to FIGS. 9 and 10.

As is shown in FIG. 9, a bucket 10 can be provided with a stationary sprocket 34 affixed to one side instead of a cam 30. As bucket 10 moves through the discharge section 23, sprocket 34 engages a rack 35, causing the bucket 10 to tip forward and discharge its contents.

Figure 12:
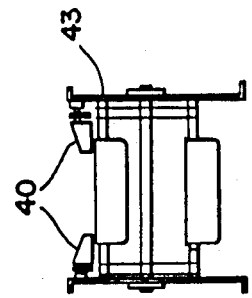
FIG. 12 is the end elevation of FIG. 11.

Another method of tipping the buckets 10 is shown in FIG. 12 where a continuous single dumping or discharge is required comprising a paddle or spider type assembly 36 that has 4 extended rollers 37 evenly pitched to match the bucket pitches and which are extended to accommodate the unnatural radius path of the bucket 10 as it is held and maintained while being guided through 180 turn, at which time the bucket contents are discharged. The assembly attached to the terminal shaft that supports the chain sprockets.

Filling can take place at any horizontal position as the buckets are always in close proximity to each other or overlapped on all horizontal runs.

Because the buckets 10 are always substantially horizontal, except when being emptied, any material that remains in the bucket after it has been emptied will not fall out during the return of the buckets to the filling position as happens in known elevators where the buckets very often return in an inverted position to the filling station.

Figure 13:
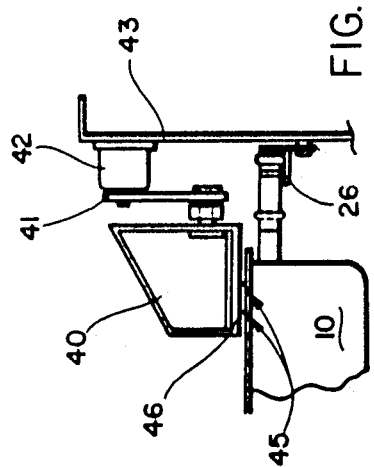
FIG. 13 shows the details of the control and leveling device in FIGS. 11 and 12.
Figure 11:
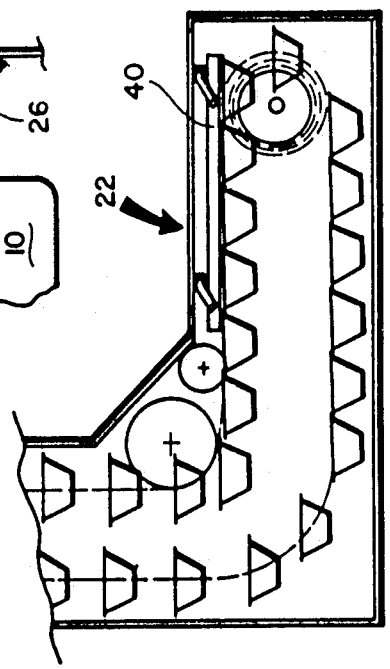
FIG. 11 shows a schematic portion side elevation of bucket elevator showing buckets supported from the chain and the application of a control or bucket leveling device.

FIG. 13 shows a partial section through a bucket elevator at a point where the material is loaded. Where the material is being loaded into the buckets, it is advantageous to correctly guide the material to be transported into the bucket with the least possible amount of spillage or loss, therefore the floating or moveable guides 40 are pivoted on arms 41 that are mounted on resilient mounts 42. These resilient mounts are then attached to the main body of the elevator/conveyor 43 which in turn supports the conveyor chain tracks 44 throughout the circuit path.

The effect of the spring loaded guides 40 maintains the stability of the buckets through the area 22 and at this time carefully directs the material to be moved into the center section of the bucket helping to control dusting of the material to be carried by offering a seal along the moving edge of the bucket lips 45. The bottom section of the guide 40 is fitted with a nylon or other low friction material 46 to present low friction face to the bucket edges as they pass beneath.

The chain 15 shown in FIGS. 3, 4, 5 and 6 may be a standard 3" pitch hollow bearing pin type chain made in carbon steel, special plastic, stainless steel or treated carbon steel. The rollers 17, which are of greater diameter than the chain arm depth can be in carbon steel, stainless steel, nylon or other materials which will assist in lubrication and maintenance.

A single chain can be used or a twin chain unit may be used.

Although as shown applied to a bucket elevator the principles of this invention may equally well be applied to any conveyor system where closed pitch buckets or other conveyor devices have to pass around bends, both internally and externally.

I claim:

1. A conveyor system comprising,
   (a) a series of buckets supported by an entrainment means defining a predetermined endless path having straight portions and at least one internal curve;
   (b) an individual elongate pivoting arm supporting a respective bucket on the entrainment means, each said pivoting arm being attached to the entrainment means at a first end thereof in fixed orientation to said entrainment means, and pivotally supporting the bucket at an opposite, free, second end thereof; and
   (c) guidance means engaging said entrainment means in advance of said at least one internal curve in the endless path to cause the free, second end of the pivoting arm to which the bucket is attached to pivot outwardly and the buckets in turn to follow a diverging curved path of greater radius than the radius of said internal curve in the endless path of the entrainment means being transited and thereby space the buckets further apart prior to and while negotiating said internal curve in the endless path than when the buckets are proceeding along a straight portion of the endless path.

2. A conveyor system according to claim 1 in which the adjacent buckets are arranged to be in touching relation along the straight portions of the path but to separate when the buckets go around a curve.

3. A conveyor system according to claim 1 in which the buckets are maintained in a substantially horizontal attitude at all times except when contents of the buckets are being discharged.

4. A conveyor system according to claim 1 in which discharge means are provided to empty the buckets comprising a cam located alongside the path of the entrainment means and a corresponding cam follower on each bucket to cause the bucket to tip and empty when the cam follower engages the cam.

5. A conveyor system according to claim 1, wherein at least one pivoting arm carrying each bucket includes a cam follower or roller at said opposite end thereof, and wherein said second guide includes a guide track for supporting said roller.

6. A conveyor system according to claim 1, wherein said entrainment means comprises a chain.

7. An elevator according to claim 6 and in which additional rollers are employed for chain guidance carried on a shaft which performs the additional function of acting as the pivot point for the pivoting arm where it is attached to the chain.

8. A method of conveying material comprising the steps of:
   (a) providing a series of buckets supported by an entrainment means along a predetermined endless path having straight portions and at least one internal curve;
   (b) supporting each bucket on the entrainment means by means of an individual pivoting arm, each said arm being attached to the entrainment means at a first end thereof in fixed orientation to said entrainment means;
   (c) pivotally supporting the bucket at the opposite, second end of said pivoting arm; and
   (d) engaging said entrainment means in advance of a curve in the endless path to cause the second end of the pivoting arm to which the bucket is attached to pivot outwardly and the buckets in turn to follow a diverging curved path of greater radius than the radius of the curve in the endless path being transited and thereby space the buckets further apart around the internal curve in the endless path than when the buckets are proceeding along a straight portion of the endless path.

* * * * *